Figure 1:
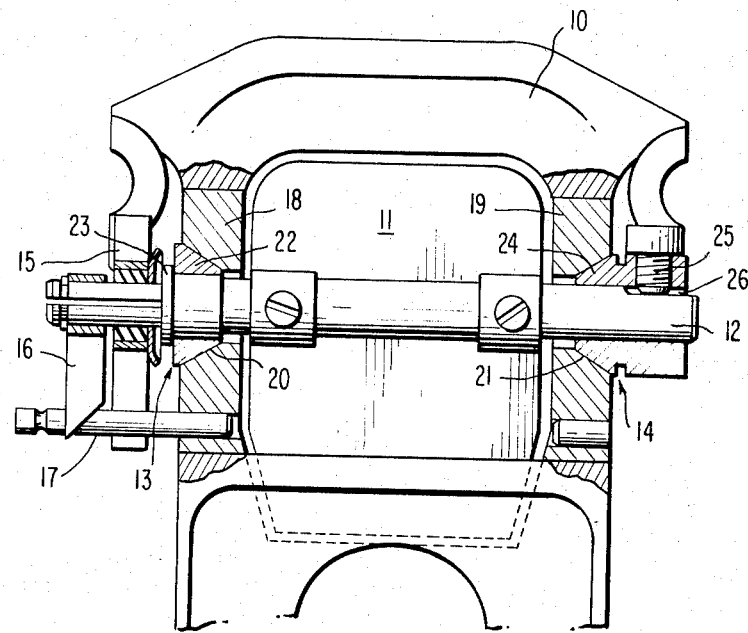

United States Patent [19]
Zink

[11] 3,774,879
[45] Nov. 27, 1973

[54] BEARING SUPPORT FOR HEATER VALVE SHAFT IN INTERNAL COMBUSTION ENGINES

[75] Inventor: Anton Zink, Fellbach, Germany

[73] Assignee: Daimler-Benz Aktiengesellschaft, Stuttgart-Unterturkheim, Germany

[22] Filed: Dec. 20, 1971

[21] Appl. No.: 210,022

[30] Foreign Application Priority Data
Dec. 23, 1970 Germany............... P 20 63 369.6

[52] U.S. Cl.............. 251/303, 308/70, 123/122 H, 251/308
[51] Int. Cl............................................. F16k 1/22
[58] Field of Search................ 308/70, 71; 123/122 H, 122 AB; 251/298-308

[56] References Cited
UNITED STATES PATENTS

| | | | |
|---|---|---|---|
| 1,891,768 | 12/1932 | Kishline | 123/122 H |
| 278,949 | 6/1883 | Hartman | 308/70 X |
| 333,049 | 12/1885 | Archibald | 308/70 X |
| 2,539,037 | 1/1951 | Shields | 308/70 UX |
| 2,883,149 | 4/1959 | Fiorentini | 251/308 X |
| 3,260,496 | 7/1966 | Borcherdt | 251/305 X |
| 3,300,137 | 1/1967 | Murphy | 251/305 X |

*Primary Examiner*—Henry T. Klinksiek
*Attorney*—Paul M. Craig et al.

[57] ABSTRACT

A bearing support for a heater-valve shaft in internal combustion engines, in which a shaft with a valve mounted thereon is arranged in an exhaust elbow or at a corresponding place, for example, in a distributor housing, which controls the inlet of the hot exhaust gases for the preheating of the suction air and/or the carburetor; the shaft is supported by means of two symmetrically arranged conical members in corresponding conical bearing portions of the exhaust elbow or of the corresponding distributor housing and at least one of the conical bearing supports is adjustable.

18 Claims, 2 Drawing Figures

BEARING SUPPORT FOR HEATER VALVE SHAFT IN INTERNAL COMBUSTION ENGINES

The present invention relates to the bearing support of a heater-valve shaft in internal combustion engines whereby a shaft with a valve or flap mounted thereon is arranged in an exhaust elbow or at a corresponding place, for example, in a distributor housing, which valve or flap controls the inlet of the hot exhaust gases for the preheating of the suction air and/or carburetor.

With known bearing supports of the aforementioned type, the heater-valve shaft is supported by means of two cylindrical bushes in the corresponding distributor housing or the like. This bearing support frequently leads to objections, and more particularly, either the predetermined clearance is excessive which has as a consequence an increased wear and above all noises or, the clearance is too small so that the shaft, as a result of deposits of combustion residues, jams or even seizes. The elimination of these shortcomings requires a considerable expenditure in work.

The present invention is concerned with the task to avoid the aforementioned disadvantages. Consequently, by means of the present invention, the occurrence of noises is to be precluded and the seizing of the shaft is to be avoided. Therebeyond, an easy readjustability and disassembly of the entire arrangement is aimed at. This goal is solved according to the present invention with the bearing supports of the aforementioned type in that the shaft is supported by means of two mutually symmetrically arranged cones in corresponding conical bearing parts of the exhaust elbow or of the corresponding distributor connection and at least one conical bearing support is adjustable.

The present invention entails the advantage that as a result of the adjustability of one conical bearing the play can now be so adjusted that neither any noise can occur nor the valve can seize. Therebeyond any possibly occurring wear can be easily compensated for by the adjustable construction. The relatively long repair times necessary heretofore can therefore be dispensed with and the assembly and disassembly of such an arrangement is simple and can be carried out without great expenditures.

The present invention includes every possible adjustment of the proposed conical bearing support. Preferred, however, is a solution according to which one of the conical parts arranged on the shaft is displaceable in the longitudinal direction of the shaft. A springy or elastic adjustment, for example, by means of a prestressed spring for the adjustable bearing support, is thereby also within the purview of the present invention, by means of which an automatic clearance and wear compensation could be achieved.

In one embodiment according to the present invention conical bearing places having a diameter increasing toward the outside are arranged in the walls of the exhaust elbow or of the distributor housing or the like and bearing parts with corresponding inclination are mounted on the shaft. A cone inclination of about 60° has proved thereby particularly appropriate. It is thereby proposed in detail that one conical bearing part is secured on the shaft so as to be axially non-displaceable and abuts outwardly thereof against a collar of the shaft and that the opposite bearing part is adjustably secured on the shaft by means of a screw engaging into a longitudinal groove of the shaft.

Heater-valve shafts are known in the art which are equipped with an eccentrically arranged weight for vibration damping. The present invention proposes for such an arrangement that a neck portion is formed on or secured at the weight, which simultaneously forms the conical bearing part. It is thereby further proposed that the weight together with the conical bearing part is axially adjustably secured on the shaft.

It has been found thereby as further advantage that with a bearing support constructed according to the present invention, the size of such a weight can be considerably reduced. This is probably due to the fact that a considerable vibration damping is achieved already by the bearing support itself.

Accordingly, it is an object of the present invention to provide a bearing support for a heater-valve shaft in an internal combustion engine which avoids by simple means the aforementioned shortcomings and drawbacks encountered in the prior art.

Another object of the present invention resides in a bearing support of a heater-valve shaft in internal combustion engines which is simple in construction and permits ready assembly and disassembly without extensive work.

A further object of the present invention resides in a bearing support for a heater-valve shaft in internal combustion engines which permits ready readjustment to avoid excessive play or seizing.

Another object of the present invention resides in a bearing support for a heater-valve shaft in internal combustion engines which eliminates excessive noise in the operation thereof as well as lengthy repair times.

Figure 2:
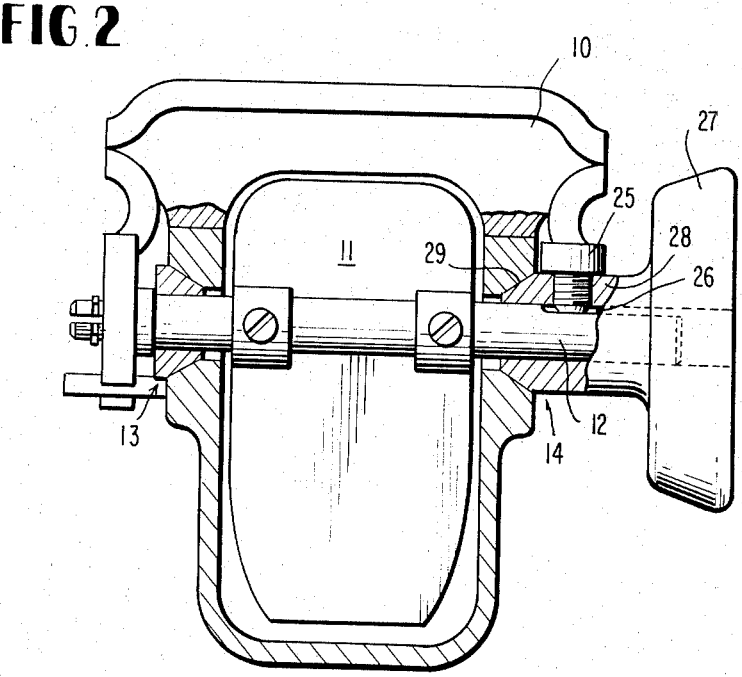

A further object of the present invention resides in a heater-valve shaft mounting in internal combustion engines which exhibits considerable damping itself These and further objects, features and advantages of the present invention will become more apparent from the following description when taken in connection with the accompanying drawing which shows, for purposes of illustration only, two embodiments in accordance with the present invention, and wherein:

FIG. 1 is a cross-sectional view through a bearing support of a heater-valve shaft in accordance with the present invention; and FIG. 2 is a cross-sectional view through a modified embodiment of a bearing support of a heater-valve shaft with damping weight in accordance with the present invention.

Referring now to the drawing wherein like reference numerals are used throughout the two views to designate like parts, and more particularly to FIG. 1, according to this figure, a heater-valve 11 mounted on a shaft 12 is supported by means of two conical bearings generally designated by reference numerals 13 and 14 within a distributor housing 10 not shown in detail — which may be secured at the exhaust elbow of an internal combustion engine or may be constructed in one piece therewith. The heater-valve or flap 11 is secured on the shaft 12, for example, by means of screws. The conical bearing support 13 is thereby fixed in the axial direction whereas the conical bearing support 14 is axially displaceable. A return spring 15 as well as an abutment pin 16 is secured externally on the heater-valve shaft 12 in a conventional manner; the abutment pin 16 cooperates with a pin 17 arranged in the housing 10. The function and operation of such a heater-valve is known as such and except for the details described herein forms no part of the present invention.

For purposes of forming the conical bearing supports 13 and 14, the wall portions 18 and 19 of the distributor housing 10 are provided with conical surfaces 20 and 21 which are disposed symmetrically to one another and have a diameter increasing toward the outside. The cone inclination thereby preferably amounts to about 60°. With the non-adjustable conical bearing support 13 a conical bearing part 22 which is secured on the shaft 12, for example, by a pressure fit, has the same conical inclination. This bearing part 22 abuts outwardly thereof against a collar 23 of the shaft 12.

With the conical bearing support 14, a conical bearing part 24 is again arranged on the shaft 12, which, however, is axially adjustable in that case. For this purpose, it is provided with a screw 25 that engages in the longitudinal slot 26 or a coresponding flatened surface at the shaft 12.

The operation of the described bearing support can be readily understood from the preceding description taken in conjunction with FIG. 1. The bearing support can be so adjusted in its play by means of the axially adjustable bearing support 14 without great difficulties and without great expenditures in work that neither a rattling nor a seizing occurs.

According to FIG. 2 the basic construction is exactly the same as in FIG. 1. In particular the axially non-adjustable bearing support 13 is constructed in the same manner. However, a weight 27 is now arranged on the shaft 12, and more particularly — as cannot be seen in the drawing — is arranged eccentrically. This weight 27 serves for the damping of any possible flutter movements of the shaft 12 and of the flap or valve 11. A neck portion 28 is formed on the weight 27 which constitutes at the same time at the end thereof the conical bearing surface 29 for the axially adjustable conical bearing support 14. The adjustment of this bearing support takes place again by the screw 25 engaging into the longitudinal slot 26 of the shaft 12. With such an adjustment the weight 27 inclusive the neck portion 28 is therefore adjusted. The operation of this arrangement is exactly the same as described by reference to FIG. 1.

While I have shown and described only two embodiments in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. A bearing support of a valve shaft in an internal combustion engine in which a shaft with a valve mounted thereon is arranged in a relatively fixed part and controls the inlet of hot gases and a weight secured on the shaft serving as vibration damping means, characterized in that the shaft is supported in the relatively fixed part by means of two mutually substantially symmetrically arranged conical bearing support means including two symmetrically arranged conical bearing members engaging in corresponding conical bearing portions having a diameter increasing toward the outside of the housing provided in walls of the relatively fixed part, and in that at least one of the conical bearing members is displaceable in the longitudinal direction of the shaft, and is adjustably secured on the shaft by means of a screw engaging in a longitudinal groove of the shaft, and in that the other bearing member is axially non-displaceably secured on the shaft and abuts externally thereof against a collar of the shaft, and in that the weight includes a neck portion which simultaneously forms one conical bearing member.

2. A bearing support according to claim 1, characterized in that the relatively fixed part is a distributor housing.

3. A bearing support according to claim 2, characterized in that the distributor housing is arranged in a part of the exhaust gas system of an internal combustion engine and in that the valve controls the inlet of the hot exhaust gases for preheating suction air and/or carburetor means.

4. A bearing support according to claim 1, characterized in that the relatively fixed part forms part of the exhaust gas system of the internal combustion engine.

5. A bearing support according to claim 4, characterized in that said relatively fixed part is an exhaust elbow.

6. A bearing support according to claim 1, characterized in that the neck portion is rigid with the weight.

7. A bearing support according to claim 1, characterized in that the neck portion is made in one piece with the weight.

8. A bearing support according to claim 1, characterized in that the weight together with its bearing member is axially adjustably secured on the shaft.

9. A bearing support for a valve shaft in an internal combustion engine to control the inlet of hot gases comprising: a means for housing at least a portion of the valve shaft, at least a pair of mutually substantially symetrically arranged conical support means disposed in said housing for supporting the valve shaft; at least a pair of symmetrically arranged conical bearing means engageable with a corresponding conical support means for rotatably supporting the valve shaft, at least one of said conical bearing means being adjustable relative to the valve shaft, and a damping means provided on at least one of said bearing means for vibration damping of the valve shaft.

10. A bearing support according to claim 9, wherein the adjustable conical bearing means is displaceable in the longitudinal direction of the valve shaft.

11. A bearing support according to claim 10, wherein said conical support means are provided with a diameter increasing toward the outside of said housing and are disposed in walls of said housing and said conical bearing means with a substantially corresponding inclination are mounted on the valve shaft.

12. A bearing support according to claim 11, wherein the other bearing means is axially non-displaceably secured on the valve shaft opposite the adjustable conical bearing means and abuts externally thereof against a collar of the valve shaft is adjustable secured on the valve shaft by means of a screw engaging in a longitudinal groove of the valve shaft.

13. A bearing support according to claim 9 wherein said conical support means are provided with a diameter increasing toward the outside of said housing and are disposed in walls of said housing and said conical bearing means with a substantially corresponding inclination are mounted on the valve shaft.

14. A bearing support according to claim 9, wherein the other bearing means is axially non-displaceably secured on the valve shaft opposite the adjustable conical bearing means and abuts externally thereof against a collar of the valve shaft is adjustable secured on the valve shaft by means of a screw engaging in a longitudinal groove of the valve shaft.

15. A bearing support according to claim 9, wherein said damping means includes a weight having a neck portion which simultaneously forms one conical bearing member.

16. A bearing support according to claim 15, wherein said neck portion is rigid with the weight.

17. A bearing support according to claim 15, wherein said neck portion is made in one piece with the weight.

18. A bearing support according to claim 15, wherein said weight together with its conical bearing means is axially adjustably secured on the shaft.

* * * * *